(12) United States Patent
Date

(10) Patent No.: US 7,013,720 B2
(45) Date of Patent: Mar. 21, 2006

(54) FUEL PRESSURE SENSING APPARATUS FOR INTERNAL COMBUSTION ENGINE CONTROL UNIT

(75) Inventor: Toshiaki Date, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 156 days.

(21) Appl. No.: 10/244,678

(22) Filed: Sep. 17, 2002

(65) Prior Publication Data

US 2003/0213294 A1 Nov. 20, 2003

(30) Foreign Application Priority Data

May 14, 2002 (JP) ............................ 2002-138874

(51) Int. Cl.
G01M 19/00 (2006.01)
(52) U.S. Cl. .................................. 73/118.1
(58) Field of Classification Search ............... 73/118.1; 123/456, 299, 497, 435, 674, 520, 675, 305, 123/529; 60/602
See application file for complete search history.

(56) References Cited

U.S. PATENT DOCUMENTS

| | | | | |
|---|---|---|---|---|
| 4,130,095 A | * | 12/1978 | Bowler et al. | ............... 123/675 |
| 5,829,418 A | * | 11/1998 | Tamura et al. | ............... 123/529 |
| 6,192,863 B1 | * | 2/2001 | Takase | ....................... 123/456 |

FOREIGN PATENT DOCUMENTS

| | | | | |
|---|---|---|---|---|
| DE | 19834660 A1 | | 7/1998 | |
| DE | 10003906 A1 | | 1/2000 | |
| DE | 10030935 A1 | | 6/2000 | |
| JP | 405106495 A | * | 4/1993 | ................ 123/447 |
| JP | 406101532 A | * | 4/1994 | ................ 123/447 |
| JP | 10-9073 | | 1/1998 | |
| JP | 10-009073 | | 1/1998 | |
| JP | 10-37789 | | 2/1998 | |
| JP | 11-50903 | | 2/1999 | |
| JP | 411062692 | * | 3/1999 | ................ 123/477 |
| JP | 11-062692 | | 5/1999 | |
| JP | 2000-249017 | | 12/2000 | |
| JP | 2003-201896 | | 7/2003 | |
| JP | 2003-206804 | | 7/2003 | |
| JP | 2003-535313 | | 11/2003 | |
| JP | 2004-502070 | | 1/2004 | |

* cited by examiner

Primary Examiner—Eric S. McCall
Assistant Examiner—Octavia Davis
(74) Attorney, Agent, or Firm—Sughrue Mion, PLLC

(57) ABSTRACT

A fuel pressure sensing apparatus for an internal combustion engine control unit is capable of compensating for deterioration in the detection accuracy of a fuel pressure sensor (16) caused by a sensor offset. The fuel pressure sensor (116) detects the pressure of compressed fuel in a fuel rail (113) to be supplied by an injector (115) to a combustion chamber defined in each cylinder of the internal combustion engine. A sensor characteristic learning part in the form of an ECU (117) performs learning correction by calculating a learned correction value to correct an output value of the fuel pressure sensor (116) when the engine or a feed pump (102) is stopped.

18 Claims, 9 Drawing Sheets

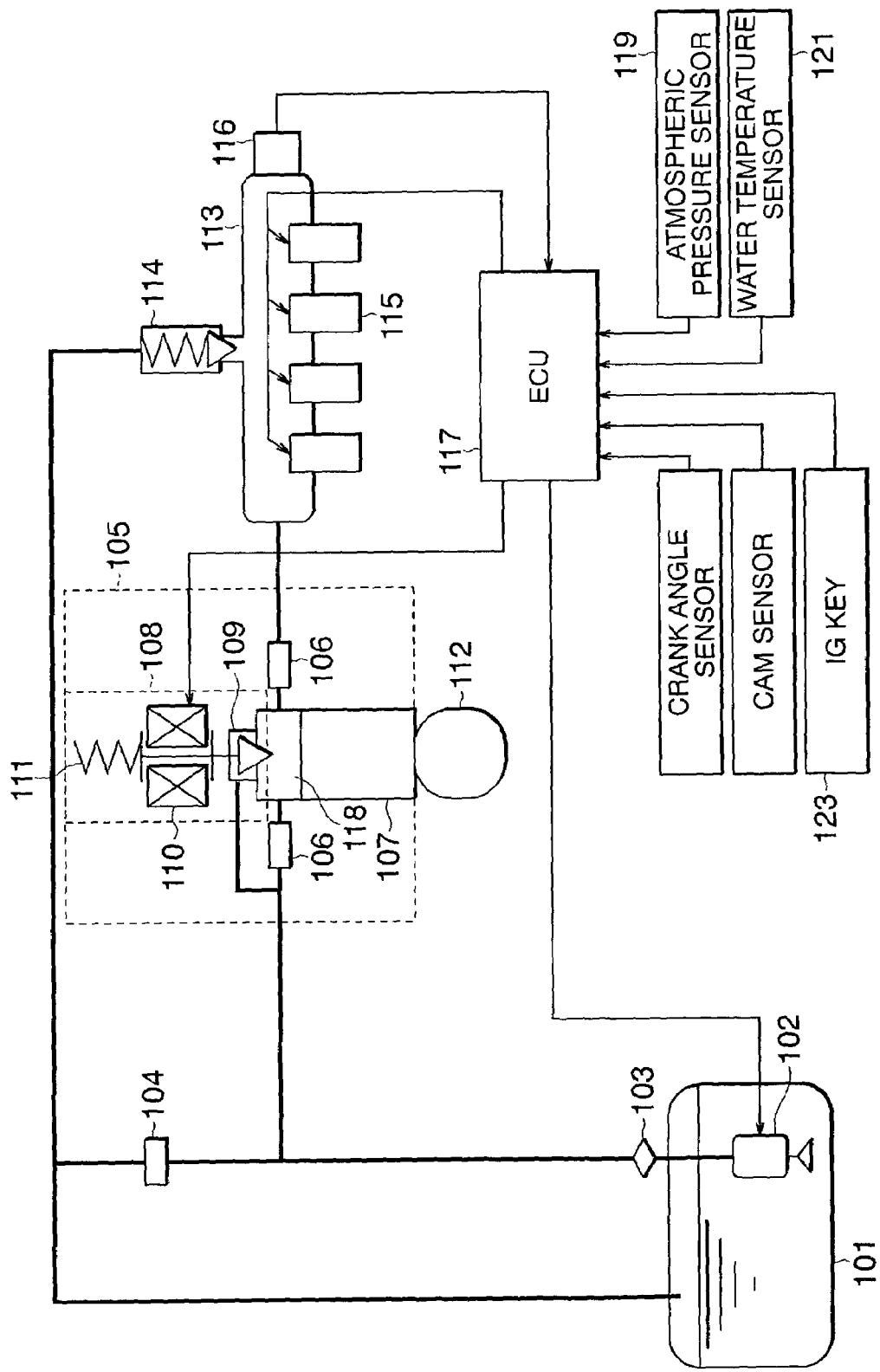

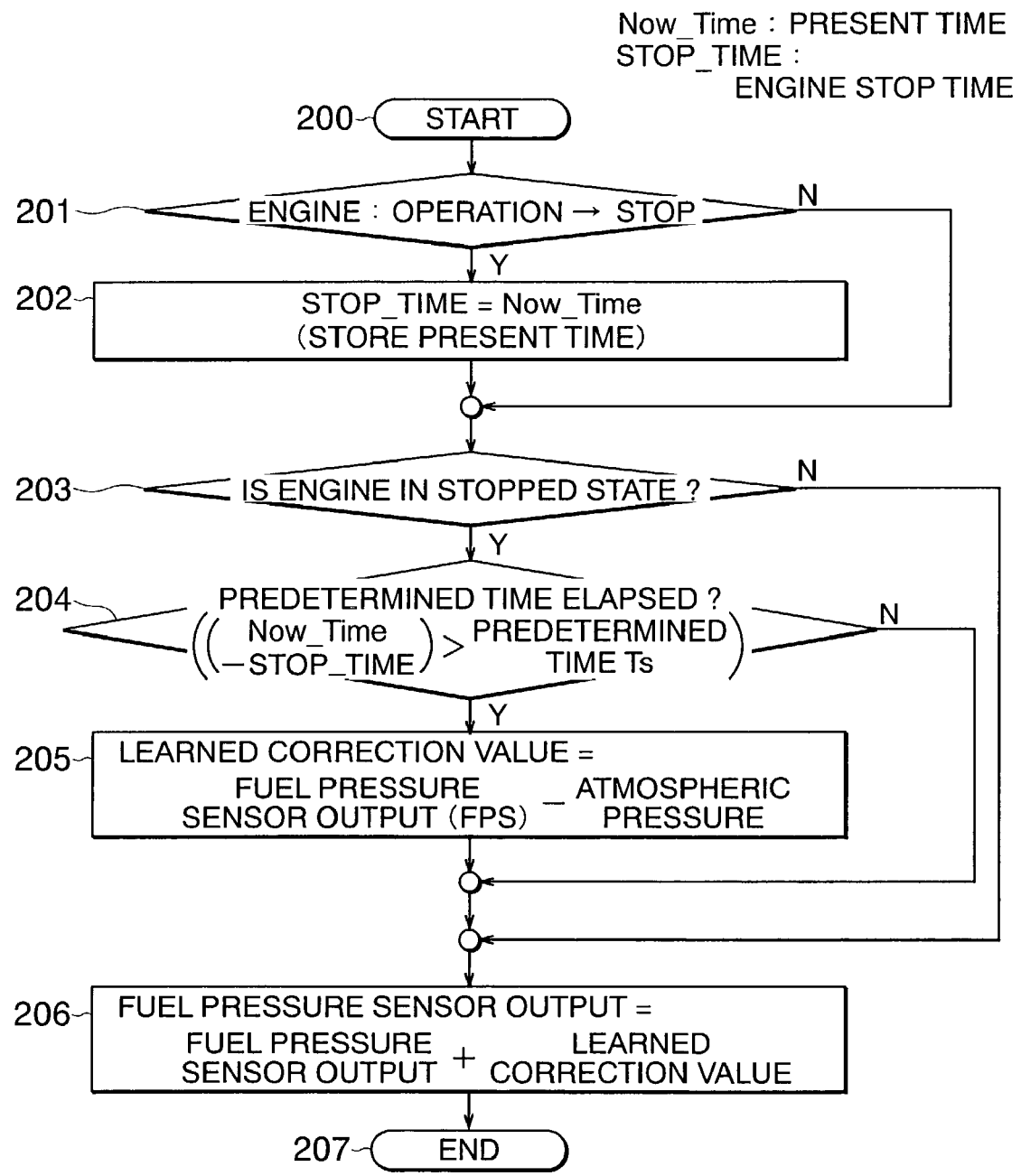

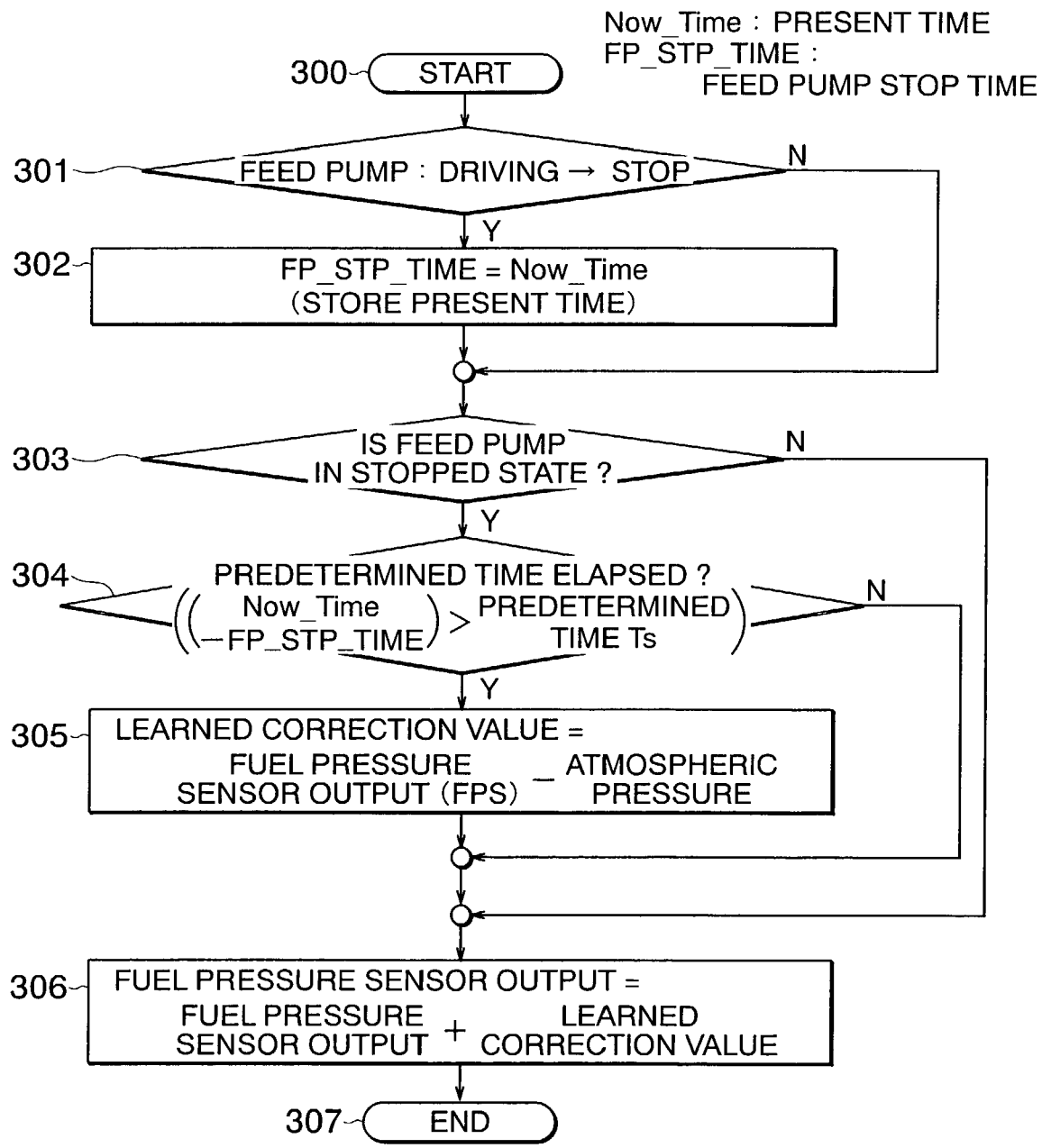

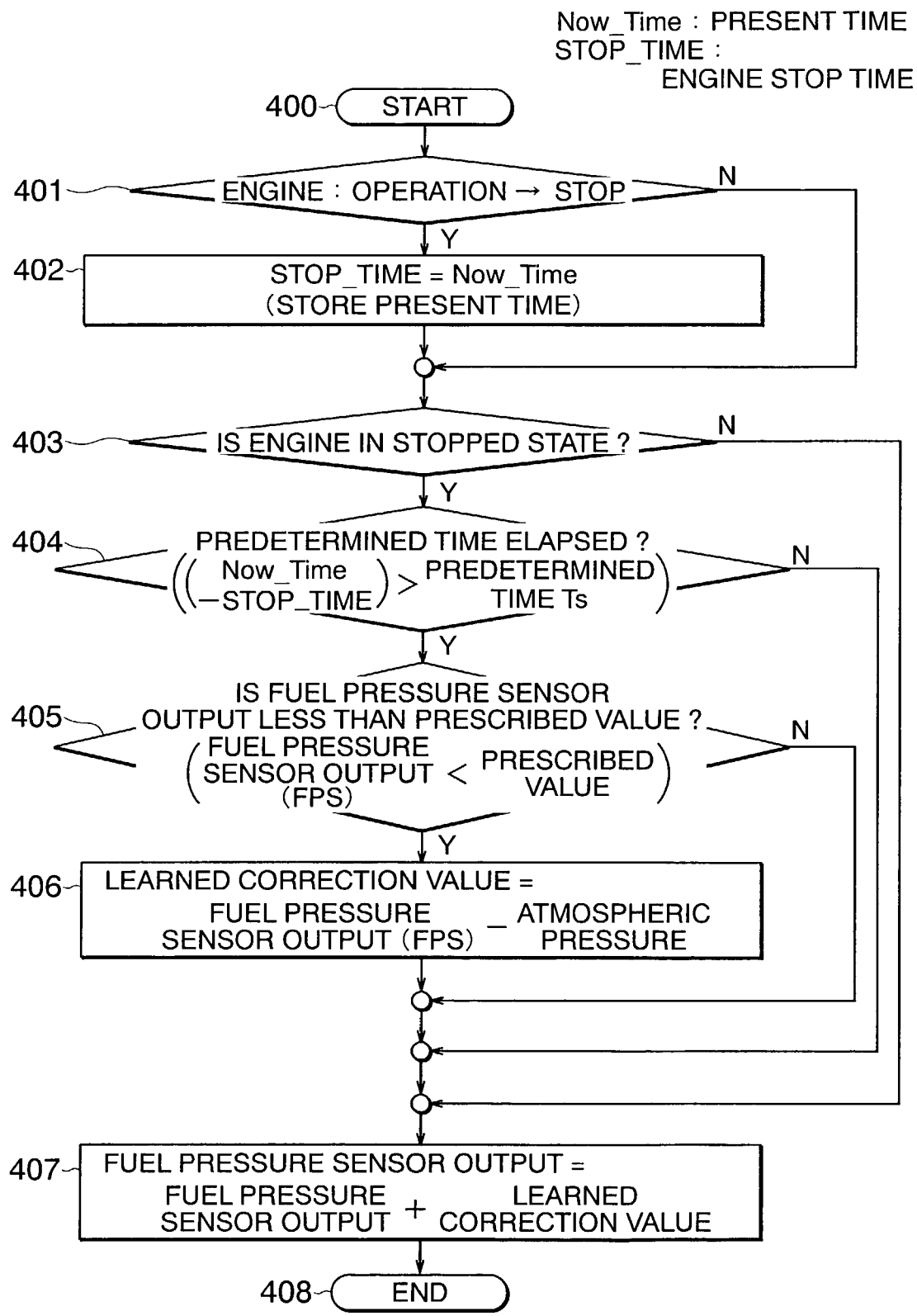

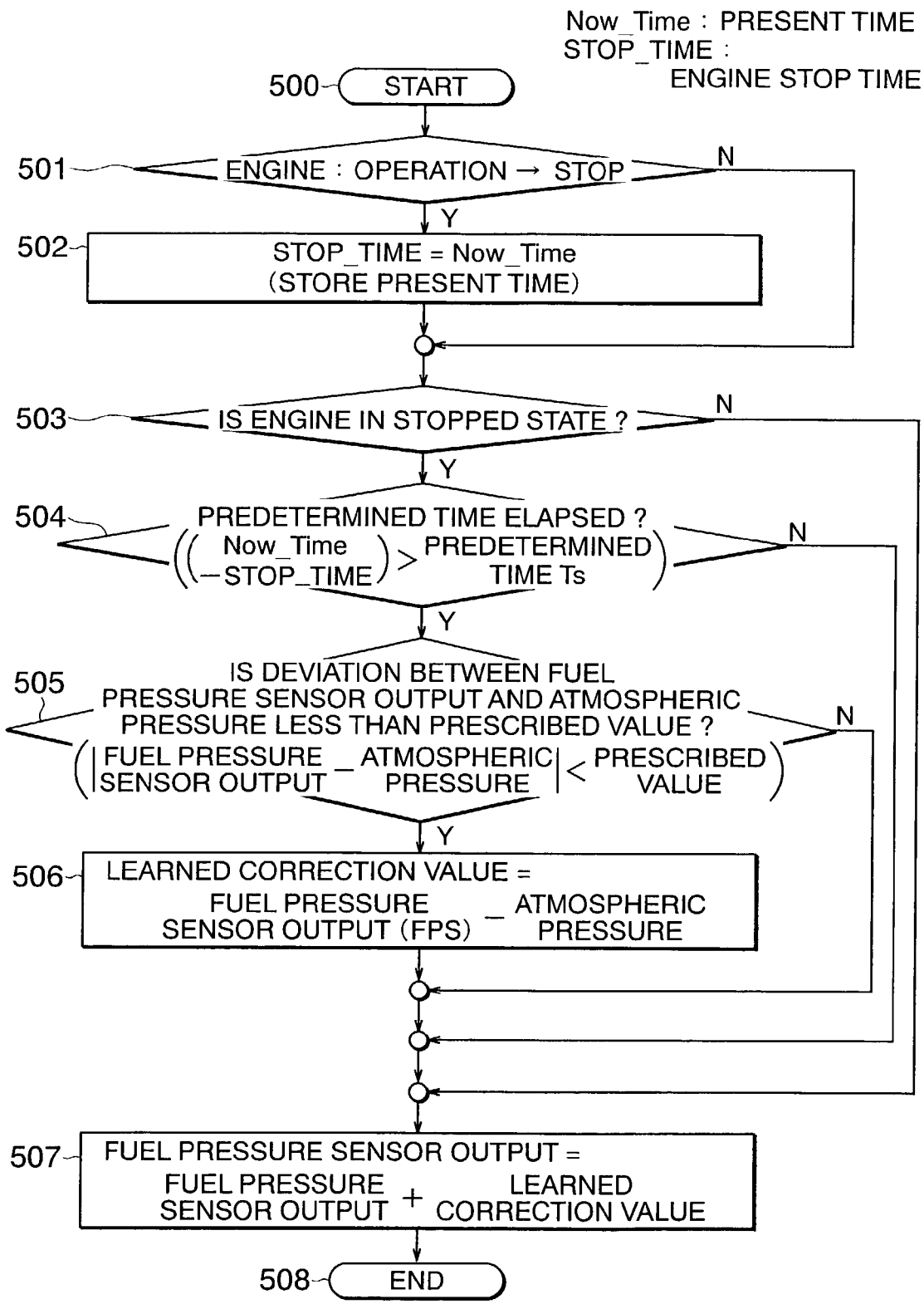

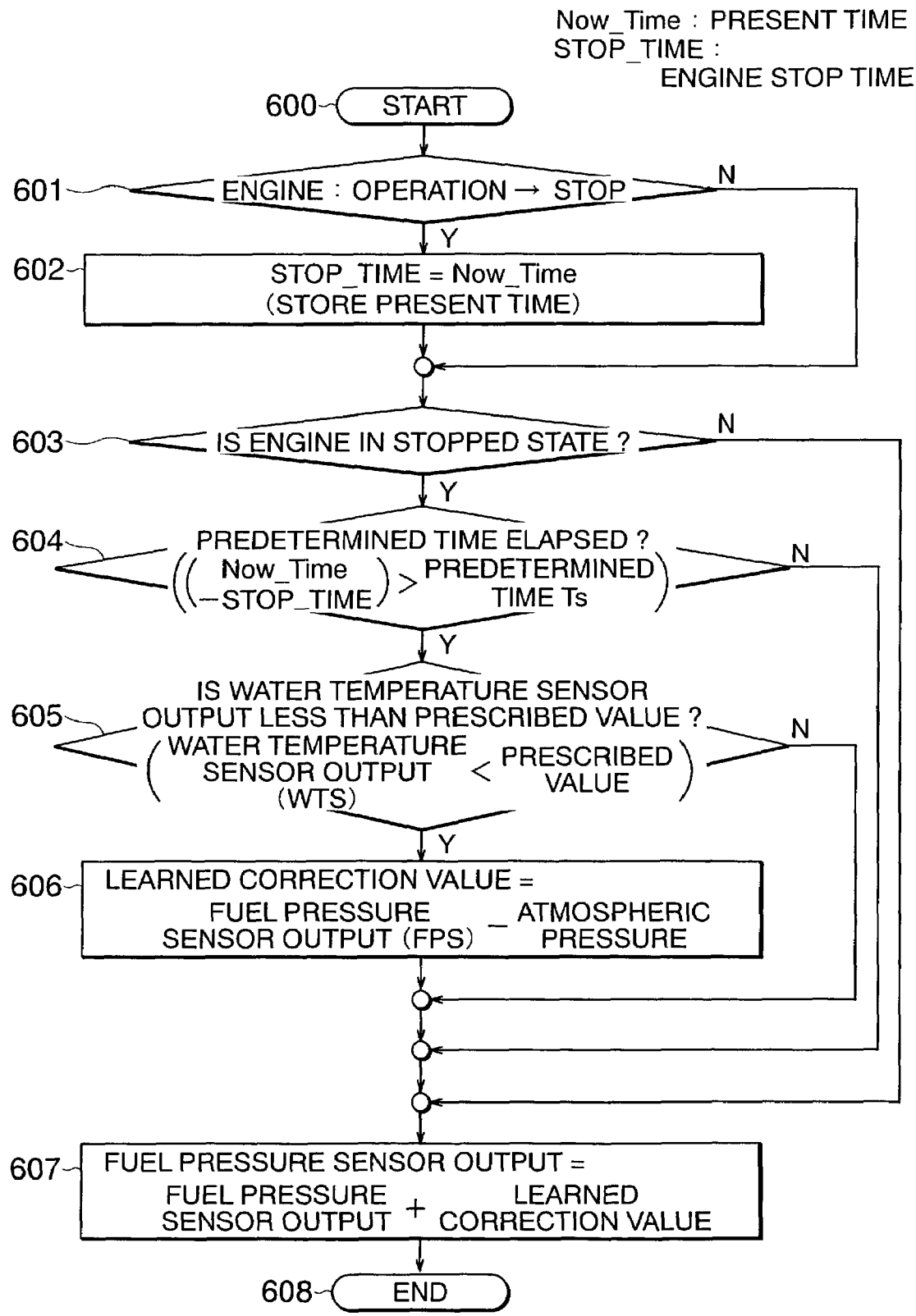

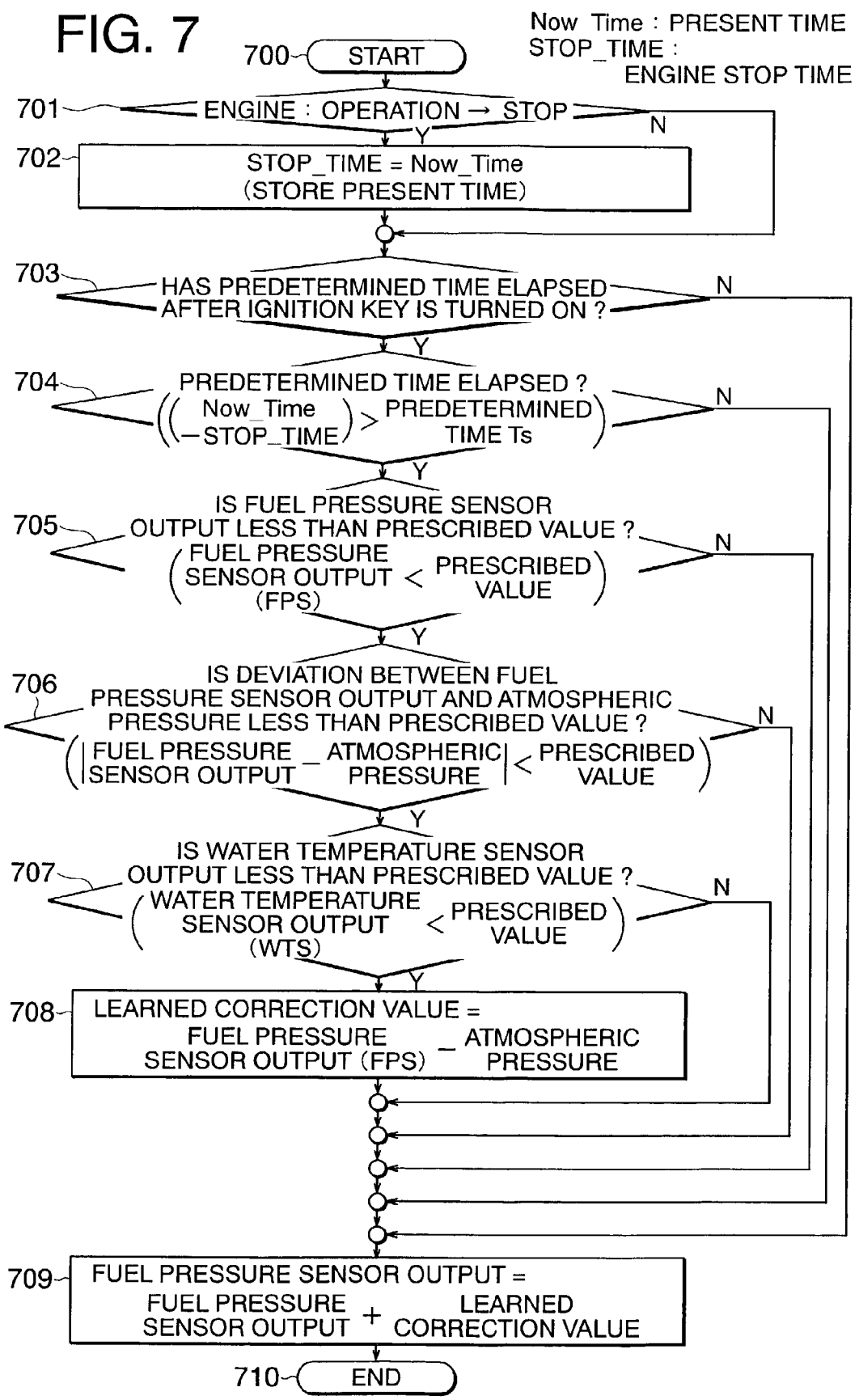

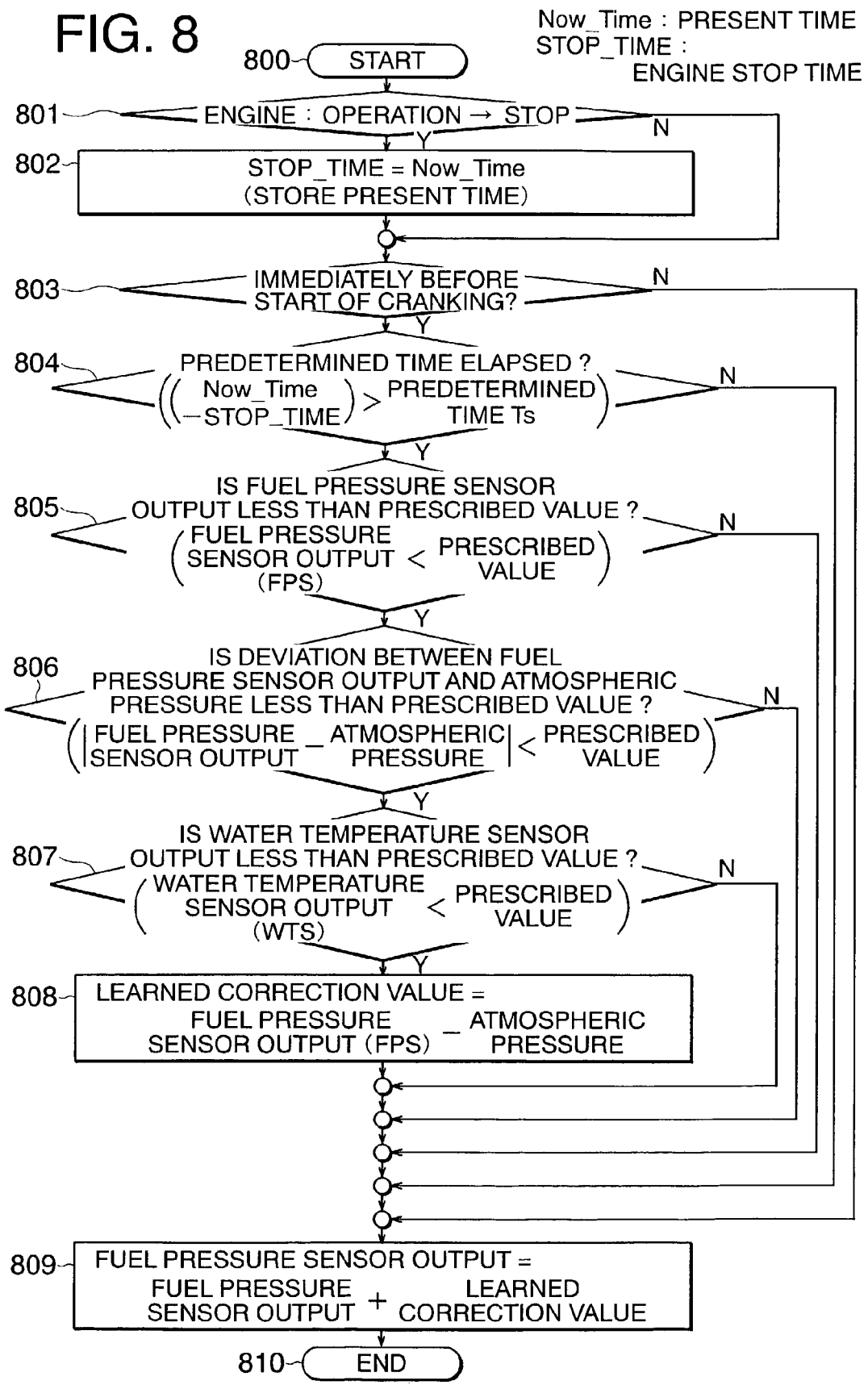

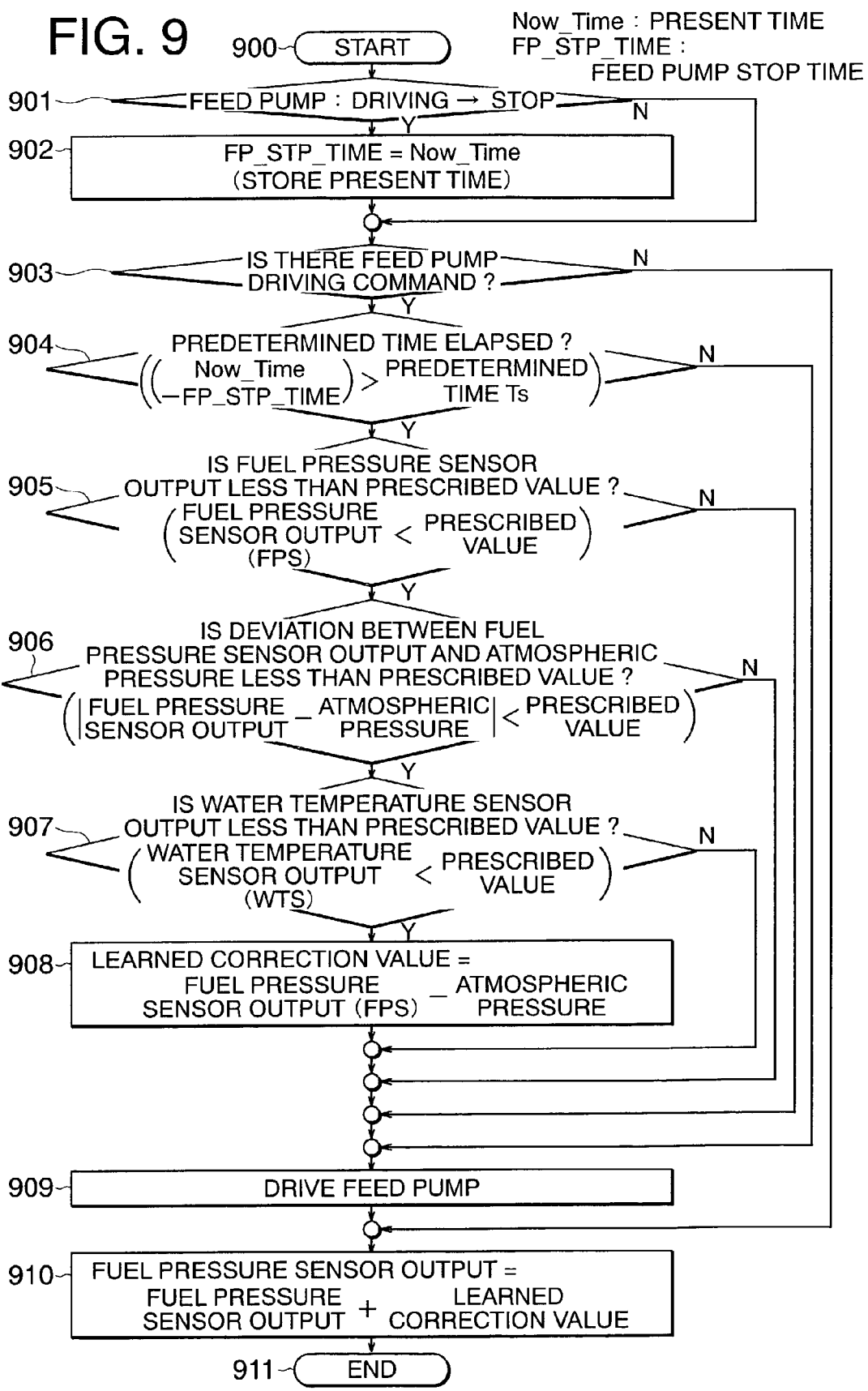

FUEL PRESSURE SENSING APPARATUS FOR INTERNAL COMBUSTION ENGINE CONTROL UNIT

BACKGROUND OF THE INVENTION

1. Field of the Invention

The present invention relates to an apparatus for compensating for the detection accuracy of a fuel pressure sensor which is capable of detecting the pressure of a supplied fuel in a spark-ignition direct-injection type internal combustion engine, etc., in which the fuel supplied by a fuel pump is directly injected into a combustion chamber in each engine cylinder.

2. Description of the Related Art

Such a kind of conventional apparatus is shown in Japanese Patent Application Laid-Open No. 11-50903 for instance. In an accumulator fuel injection apparatus disclosed therein, an internal combustion engine equipped with the accumulator fuel injection apparatus is run in a steady-state operation so as to compensate for deterioration in the detection accuracy owing to manufacturing tolerances, aging, etc., of a fuel pressure sensor. An output deviation in the fuel pressure sensor is compensated for by calculating a compensation value for the fuel pressure sensor based on an instructed fuel pressure value and an estimated fuel pressure value, or based on an instructed fuel injection amount and an actual fuel injection amount, or based on a change rate of an instructed fuel pressure value and a change rate of an instructed fuel injection amount, or based on an estimated engine rotational speed and an actual engine rotational speed.

In such a conventional apparatus, however, the above measure has been taken for compensation of the gain characteristic of the fuel pressure sensor, but no consideration is given to compensating for an output deviation of the fuel pressure sensor resulting from an offset thereof. That is, when there takes place deterioration in the detection accuracy of the fuel pressure sensor resulting from the sensor offset, even if the sensor gain has been compensated for in a certain steady-state operation of the internal combustion engine, the detection accuracy of the sensor might contrarily be deteriorated when the engine gets out of the steady-state condition in which the sensor gain was compensated.

SUMMARY OF THE INVENTION

The present invention is intended to obviate the above-mentioned problem, and has for its object to provide a fuel pressure sensing apparatus for an internal combustion engine control unit which is capable of compensating for deterioration in the detection accuracy of a fuel pressure sensor caused by a sensor offset.

Bearing the above object in mind, the present invention resides in a fuel pressure sensing apparatus for an internal combustion engine control unit which includes: a fuel pressure sensor for detecting the pressure of compressed fuel in a fuel rail to be supplied by an injector to a combustion chamber defined in each cylinder of the internal combustion engine; and a sensor characteristic learning part for performing learning correction by calculating a learned correction value to correct an output value of the fuel pressure sensor when the engine or a feed pump is stopped.

According to the above arrangement, it is possible to easily compensate for deterioration in the detection accuracy caused by an offset of the fuel pressure sensor by learning the output value of the fuel pressure sensor at the time of stoppage of the internal combustion engine or the feed pump.

In a preferred form of the present invention, the sensor characteristic learning part calculates, as the learned correction value, a difference between atmospheric pressure and the output value of the fuel pressure sensor after a predetermined time has elapsed after stoppage of the engine.

In another preferred form of the present invention, the sensor characteristic learning part calculates, as the learned correction value, a difference between atmospheric pressure and the output value of the fuel pressure sensor after a predetermined time has elapsed after stoppage of the feed pump which draws up fuel from a fuel tank.

In a further preferred form of the present invention, the sensor characteristic learning part calculates, as the learned correction value, a difference between atmospheric pressure and the output value of the fuel pressure sensor after a predetermined time has elapsed after stoppage of the engine or the feed pump and when the output value of the fuel pressure sensor is below a prescribed value.

In a still further preferred form of the present invention, the sensor characteristic learning part calculates, as the learned correction value, a difference between atmospheric pressure and the output value of the fuel pressure sensor after a predetermined time has elapsed after stoppage of the engine or the feed pump and when a difference between atmospheric pressure and the output value of the fuel pressure sensor is below a prescribed value.

In a yet further preferred form of the present invention, the fuel pressure sensing apparatus further includes an engine cooling water temperature sensor for sensing the temperature of engine cooling water. The sensor characteristic learning part calculates, as the learned correction value, a difference between atmospheric pressure and the output value of the fuel pressure sensor after a predetermined time has elapsed after stoppage of the engine or the feed pump and when the temperature of the engine cooling water sensed by the engine cooling water temperature sensor is below a predetermined value.

In a further preferred form of the present invention, the sensor characteristic learning part calculates the learned correction value after a predetermined time has elapsed after turning on of an ignition key instead of stoppage of the engine or the feed pump.

In a further preferred form of the present invention, in the sensor characteristic learning part, a predetermined time after stoppage of the engine or the feed pump is immediately before the start of engine cranking.

In a further preferred form of the present invention, in the sensor characteristic learning part, a predetermined time after stoppage of the engine or the feed pump is immediately before the feed pump is actually driven to operate at an instant when a driving instruction is generated to the feed pump.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 1 is a view showing the configuration of a fuel system including a fuel pressure sensor in an internal combustion engine control unit according to the present invention.

FIG. 2 is a flow chart explaining a learning correction method of correcting through learning the output characteristic of a fuel pressure sensor according to a first embodiment of the present invention.

FIG. 3 is a flow chart explaining a learning correction method of correcting through learning the output characteristic of a fuel pressure sensor according to a second embodiment of the present invention.

FIG. 4 is a flow chart explaining a learning correction method of correcting through learning the output characteristic of a fuel pressure sensor according to a third embodiment of the present invention.

FIG. 5 is a flow chart explaining a learning correction method of correcting through learning the output characteristic of a fuel pressure sensor according to a fourth embodiment of the present invention.

FIG. 6 is a flow chart explaining a learning correction method of correcting through learning the output characteristic of a fuel pressure sensor according to a fifth embodiment of the present invention.

FIG. 7 is a flow chart explaining a learning correction method of correcting through learning the output characteristic of a fuel pressure sensor according to a sixth embodiment of the present invention.

FIG. 8 is a flow chart explaining a learning correction method of correcting through learning the output characteristic of a fuel pressure sensor according to a seventh embodiment of the present invention.

FIG. 9 is a flow chart explaining a learning correction method of correcting through learning the output characteristic of a fuel pressure sensor according to an eighth embodiment of the present invention.

DESCRIPTION OF THE PREFERRED EMBODIMENTS

Now, preferred embodiments of the present invention will be described below in detail while referring to the accompanying drawings.

Embodiment 1.

FIG. 1 is a view which shows the configuration of a fuel system including a fuel pressure sensor in an internal combustion engine control unit according to the present invention. The hardware configuration of the fuel system shown in FIG. 1 is commonly used in all the embodiments of the present invention to be described later. In FIG. 1, fuel drawn from a fuel tank 101 by means of a feed pump 102 is supplied through a filter 103 to a pressure regulator 104 where the fuel pressure is adjusted and introduced into a high-pressure pump 105. A piston 107 in the high-pressure pump 105 is caused to move in a vertical direction by means of a pump cam 112 which is operatively coupled with an intake or exhaust cam shaft so as to rotate integrally therewith, whereby the volume of a booster chamber 118 defined in a housing of the high-pressure pump 105 is varied, thereby forcing the compressed fuel in the booster chamber 118 to be introduced into a fuel rail 113. 106 denotes a check valve.

The amount of fuel introduced into the fuel rail 113 is adjusted by a spill valve 108. The spill valve 108 is driven to move upwardly by energization of a coil 110, thus overcoming the biasing force of a spring 111 to open a valve 109. Upon opening of the valve 109, the booster chamber 118 is placed in fluid communication with a suction side so that the fuel is not sent to the fuel rail 113 but it is returned to the suction side. As a result, the fuel is not discharged from the pump 105 to the fuel rail 113. When the fuel pressure in the fuel rail 113 reaches a valve opening pressure of a relief valve 114, the relief valve 114 is caused to open, thus permitting the fuel in the fuel rail 113 to return to the fuel tank 101. The fuel pressure sensor 116 detects the fuel pressure in the fuel rail 113 and generates an output signal representative of the detected fuel pressure to an ECU (engine control unit) 117 which performs feedback control, etc. Injectors 115 each serve to supply the high-pressure fuel in the fuel rail 113 directly to a corresponding combustion chamber defined in each cylinder of the internal combustion engine.

During operation of the internal combustion engine, the fuel pressure in the fuel rail 113 is feedback controlled by the ECU 117 so as to be kept at a high pressure so that it becomes a target fuel pressure. However, after the internal combustion engine is stopped, the fuel pressure in the fuel rail 113 falls gradually to an atmospheric pressure level.

That is, when a predetermined time has elapsed after the feed pump 102 was stopped, the fuel pressure in the fuel rail 113 becomes atmospheric pressure. Accordingly, learning correction is performed so that the output value of the fuel pressure sensor 116 at this time comes to atmospheric pressure.

Hereinafter, reference will be made to a learning correction method of correcting through learning the fuel pressure sensor output characteristic according to a first embodiment of the present invention while using a flow chart of FIG. 2. First of all, in step 201, it is determined whether the engine has come to a stopped state from its operating state. At this time, the present or current time (Now_Time) is stored in the ECU 117 in step 202. Here, the feed pump 102 is in a stopped state and hence the fuel pressure in the fuel rail 113 falls gradually.

Then in step 203, it is determined whether the engine is in a stopped state. If the engine is in a stopped state, it is further determined in step 204 whether a predetermined time (Ts) has elapsed after the engine was stopped (STOP_TIME). When it is determined that the predetermined time (Ts) has elapsed, a determination is made that the fuel pressure in the fuel rail 113 has fallen to atmospheric pressure, and then in step 205, a difference between the output value (FPS) of the fuel pressure sensor 116 and atmospheric pressure is stored as an amount of learning (i.e., a learned correction value or a learned value). Thereafter, in step 206, the amount of learning or learned correction value stored in step 205 is added to the output value (FPS) of the fuel pressure sensor 116 thereby to learning correct the output characteristic of the fuel pressure sensor 116.

Here, note that the output value of an atmospheric pressure sensor 119 or an appropriate value stored in the ECU 117 beforehand may be used as atmospheric pressure.

Embodiment 2.

A second embodiment of the present invention will be described below using a flow chart of FIG. 3. First, in step 301, it is determined whether the feed pump 102 has come to a stopped state from its driving state. At this time, the present time (Now_Time) is stored in the ECU 117 in step 302. Here, the feed pump 102 is in a stopped state and hence the fuel pressure in the fuel rail 113 falls gradually.

Then, in step 303, it is determined whether the feed pump 102 is a stopped state. If the feed pump 102 is in a stopped state, it is determined in step 304 whether a predetermined time (Ts) has elapsed after the feed pump 102 was stopped (FP_STP_TIME). When it is determined that the predetermined time (Ts) has elapsed, a determination is made that the fuel pressure in the fuel rail 113 has fallen to atmospheric pressure, and then in step 305, a difference between the output value (FPS) of the fuel pressure sensor 116 and atmospheric pressure is stored as an amount of learning (i.e., a learned correction value). Thereafter, in step 306, the amount of learning or learned correction value stored in step 305 is added to the output value (FPS) of the fuel pressure sensor 116 thereby to learning correct the output characteristic of the fuel pressure sensor 116.

Here, note that the output value of the atmospheric pressure sensor 119 or an appropriate value stored in the ECU 117 beforehand may be used as atmospheric pressure.

Embodiment 3.

A third embodiment of the present invention will be described below using a flow chart of FIG. 4. In the first embodiment or the second embodiment, in order to prevent erroneous or improper learning correction, it is determined in step 405 whether the output value (FPS) of the fuel pressure sensor 116 is below a prescribed value. If it is confirmed that the output value (FPS) of the fuel pressure sensor 116 has fallen enough to an atmospheric pressure level, the learned correction value is then stored in step 406. Note that in case where this embodiment is applied to the second embodiment, the engine in steps 401, 403 is replaced by the feed pump 102.

Embodiment 4.

A fourth embodiment of the present invention will be described below using a flow chart of FIG. 5. In the first embodiment or the second embodiment, in order to prevent erroneous or improper learning correction, it is determined in step 505 whether a deviation or difference between the output value (FPS) of the fuel pressure sensor 116 and atmospheric pressure is below a prescribed value. If it is confirmed that the output value (FPS) of the fuel pressure sensor 116 has fallen enough to an atmospheric pressure level, the learned correction value is then stored in step 506. Note that in case where this embodiment is applied to the second embodiment, the engine in steps 501, 503 is replaced by the feed pump 102. This is applicable in the following embodiments in which the engine is stopped or the feed pump 102 is stopped.

Embodiment 5.

A fifth embodiment of the present invention will be described below using a flow chart of FIG. 6. In the first embodiment or the second embodiment, in order to prevent erroneous or improper learning correction, it is determined in step 605 that the output (WTS) of a water temperature sensor (engine cooling water temperature sensor) 121 representative of the temperature of cooling water for the internal combustion engine is below a prescribed value. If it is confirmed that a sufficient time has elapsed after the internal combustion engine was stopped, that is, if it is confirmed that a sufficient time has passed after stoppage of the feed pump 102, the learned correction value is then stored in step 606. Note that in case where this embodiment is applied to the second embodiment, the engine in steps 601, 603 is replaced by the feed pump 102.

Embodiment 6.

A sixth embodiment of the present invention will be described below using a flow chart of FIG. 7. According to this sixth embodiment, it is possible to carry out learning in a state in which the output characteristic of the fuel pressure sensor 116 has been compensated for, by making a determination of the engine stopped state in step 203 in the first embodiment or a determination of the feed pump stopped state in step 303 in the second embodiment at or after the time when a predetermined time (Ts) has elapsed after an ignition key (IG KEY) 123 shown in FIG. 1 is shifted from a turned-off state into a turned-on state, as shown in step 703 in FIG. 7. In addition, it becomes unnecessary to always perform learning when the engine is in a stopped state or when the feed pump 102 is in a stopped state. That is, the correction of deterioration in the detection accuracy due to the manufacturing tolerances or aging of the fuel pressure sensor 116 need not frequently be performed. Note that at least one of a determination in the third embodiment as to whether the output value (FPS) of the fuel pressure sensor 116 is below a prescribed value, as shown in step 705, a determination in the fourth embodiment as to whether a deviation between the output value (FPS) of the fuel pressure sensor 116 and atmospheric pressure is below a prescribed value, as shown in step 706, or a determination in the fifth embodiment as to whether the output value (WTS) of the water temperature sensor 121 is below a prescribed value, as shown in step 707, may be added.

Embodiment 7.

A seventh embodiment of the present invention will be described below using a flow chart of FIG. 8. According to this seventh embodiment, it is possible to carry out learning in a state in which the output characteristic of the fuel pressure sensor 116 has been compensated for, by making a determination of the engine stopped state in step 203 in the first embodiment or a determination of the feed pump stopped state in step 303 in the second embodiment immediately before the start of engine cranking, as shown in step 803 in FIG. 8. In addition, it becomes unnecessary to always perform learning when the engine is in a stopped state or when the feed pump 102 is in a stopped state. That is, the correction of deterioration in the detection accuracy due to the manufacturing tolerances or aging of the fuel pressure sensor 116 need not frequently be performed.

Here, it is to be note that the timing immediately before the start of engine cranking can be determined from the state in which in the sequence of a series of internal combustion engine control processes of the ECU 117, an instruction of starting engine cranking is issued and a flag (not shown in particular) for indicating this is set up in the ECU 117. The term "immediately before engine cranking" means the timing before engine cranking is actually started immediately after a flag corresponding to an issued instruction of starting engine cranking has been set. Moreover, note that at least one of a determination in the third embodiment as to whether the output value (FPS) of the fuel pressure sensor 116 is below a prescribed value, as shown in step 805, a determination in the fourth embodiment as to whether a deviation or difference between the output value (FPS) of the fuel pressure sensor 116 and atmospheric pressure is below a prescribed value, as shown in step 806, or a determination in the fifth embodiment as to whether the output value (WTS) of the water temperature sensor 121 is below a prescribed value, as shown in step 807, may be added.

Embodiment 8.

An eighth embodiment of the present invention will be described below using a flow chart of FIG. 9. First of all, in step 901, it is determined whether the feed pump 102 has come to a stopped state from its driving state. At this time, the present time (Now_Time) is stored in the ECU 117 in step 902. Here, the feed pump 102 is in a stopped state and hence the fuel pressure in the fuel rail 113 falls gradually.

Then, in step 903, it is determined whether there is generated an instruction of driving the feed pump 102. When a feed pump driving instruction is generated (e.g., whether such an instruction is generated is determined from the state of a corresponding flag in the ECU 117 as in the seventh embodiment), the feed pump 102 is not driven to operate at once, but it is determined in steps 904 through 907 whether a sufficient time has elapsed after the feed pump 102 was stopped, as in the first through fifth embodiments. When it is determined here that a sufficient time has elapsed, a determination is made that the fuel pressure in the fuel rail 113 has fallen to atmospheric pressure, and then in step 908, a difference between the output value (FPS) of the fuel pressure sensor 116 and atmospheric pressure is stored as an amount of learning. Thereafter, in step 909, the feed pump 102 is driven to operate, and in step 910, the amount of learning or learned correction value stored in step 908 is added to the output value of the fuel pressure sensor 116 thereby to learning correct the output characteristic of the fuel pressure sensor 116.

Here, note that the output value of the atmospheric pressure sensor 119 or an appropriate value stored in the ECU 117 beforehand may be used as atmospheric pressure.

As described in the foregoing, according to the present invention, it is possible to easily compensate for deterioration in the detection accuracy caused by an offset of a fuel pressure sensor by learning an output value of the fuel pressure sensor at the time of stoppage of an internal combustion engine or a fuel feed pump.

In addition, deterioration in the detection accuracy of the fuel pressure sensor can easily be compensated for by correcting through learning the output value of the fuel pressure sensor to atmospheric pressure after a predetermined time has elapsed after stoppage of the engine.

Moreover, deterioration in the detection accuracy of the fuel pressure sensor can easily be compensated for by correcting through learning the output value of the fuel pressure sensor to atmospheric pressure after a predetermined time has elapsed after stoppage of the feed pump.

Further, mis-learning of the fuel pressure sensor can be prevented by adding, as a requirement for performing the learning correction of the fuel pressure sensor, the condition that the output value of the fuel pressure sensor is below a prescribed value, thereby to narrow the requirement for learning the output characteristic of the fuel sensor to the case when the output value of the fuel pressure sensor is in the vicinity of atmospheric pressure.

Furthermore, mis-learning of the fuel pressure sensor can also be prevented by adding, as a requirement for performing the learning correction of the fuel pressure sensor, the condition that a difference between the output value of the fuel pressure sensor and atmospheric pressure is below a prescribed value, thereby to narrow the requirement for learning the output characteristic of the fuel sensor to the case when the output value of the fuel pressure sensor is in the vicinity of atmospheric pressure.

Still further, mis-learning of the fuel pressure sensor can also be prevented by adding, as a requirement for performing the learning correction of the fuel pressure sensor, the condition that the output value of an engine cooling water temperature sensor is below a prescribed value, thereby to narrow the requirement for learning the output characteristic of the fuel sensor to the case when the temperature of engine cooling water is low after a sufficient time has elapsed after stoppage of the internal combustion engine.

In addition, by carrying out the learning correction of the fuel pressure sensor after a predetermined time has elapsed after an ignition key was shifted from a turned-off state to a turned-on state, it becomes possible to perform the learning in a state in which the output characteristic of the fuel pressure sensor has been compensated.

Moreover, by carrying out the learning correction of the fuel pressure sensor immediately before the start of engine cranking, it becomes possible to perform the learning in a state in which the output characteristic of the fuel pressure sensor has been compensated.

Further, by carrying out the learning correction of the fuel pressure sensor when an instruction for driving the feed pump from its stopped state is generated, it becomes possible to correct through learning the output value of the fuel pressure sensor to atmospheric pressure immediately before the feed pump is driven to operate.

While the invention has been described in terms of preferred embodiments, those skilled in the art will recognize that the invention can be practiced with modifications within the spirit and scope of the appended claims.

What is claimed is:

1. A fuel pressure sensing apparatus for an internal combustion engine control unit comprising:
   a fuel pressure sensor for detecting the pressure of compressed fuel in a fuel rail to be supplied by an injector to a combustion chamber defined in each cylinder of the internal combustion engine; and
   sensor characteristic learning means for performing learning correction by calculating a learned correction value to correct an output value of said fuel pressure sensor when said engine or a feed pump is stopped.

2. The fuel pressure sensing apparatus for an internal combustion engine control unit according to claim 1, wherein said sensor characteristic learning means calculates, as said learned correction value, a difference between atmospheric pressure and the output value of said fuel pressure sensor after a predetermined time has elapsed after stoppage of said engine.

3. The fuel pressure sensing apparatus for an internal combustion engine control unit according to claim 1, wherein said sensor characteristic learning means calculates, as said learned correction value, a difference between atmospheric pressure and the output value of said fuel pressure sensor after a predetermined time has elapsed after stoppage of said feed pump which draws up fuel from a fuel tank.

4. The fuel pressure sensing apparatus for an internal combustion engine control unit according to claim 2, wherein said sensor characteristic learning means calculates, as said learned correction value, a difference between atmospheric pressure and the output value of said fuel pressure sensor after a predetermined time has elapsed after stoppage of said engine or said feed pump and when the output value of said fuel pressure sensor is below a prescribed value.

5. The fuel pressure sensing apparatus for an internal combustion engine control unit according to claim 3, wherein said sensor characteristic learning means calculates, as said learned correction value, a difference between atmospheric pressure and the output value of said fuel pressure sensor after a predetermined time has elapsed after stoppage of said engine or said feed pump and when the output value of said fuel pressure sensor is below a prescribed value.

6. The fuel pressure sensing apparatus for an internal combustion engine control unit according to claim 2, wherein said sensor characteristic learning means calculates, as said learned correction value, a difference between atmospheric pressure and the output value of said fuel pressure sensor after a predetermined time has elapsed after stoppage of said engine or said feed pump and when a difference between atmospheric pressure and the output value of said fuel pressure sensor is below a prescribed value.

7. The fuel pressure sensing apparatus for an internal combustion engine control unit according to claim 3, wherein said sensor characteristic learning means calculates, as said learned correction value, a difference between atmospheric pressure and the output value of said fuel pressure sensor after a predetermined time has elapsed after stoppage of said engine or said feed pump and when a difference between atmospheric pressure and the output value of said fuel pressure sensor is below a prescribed value.

8. The fuel pressure sensing apparatus for an internal combustion engine control unit according to claim 2, further comprising an engine cooling water temperature sensor for sensing the temperature of engine cooling water, wherein said sensor characteristic learning means calculates, as said learned correction value, a difference between atmospheric pressure and the output value of said fuel pressure sensor after a predetermined time has elapsed after stoppage of said engine or said feed pump and when the temperature of the engine cooling water sensed by said engine cooling water temperature sensor is below a predetermined value.

9. The fuel pressure sensing apparatus for an internal combustion engine control unit according to claim 3, further comprising an engine cooling water temperature sensor for sensing the temperature of engine cooling water, wherein said sensor characteristic learning means calculates, as said learned correction value, a difference between atmospheric pressure and the output value of said fuel pressure sensor after a predetermined time has elapsed after stoppage of said engine or said feed pump and when the temperature of the engine cooling water sensed by said engine cooling water temperature sensor is below a predetermined value.

10. The fuel pressure sensing apparatus for an internal combustion engine control unit according to claim 1, wherein said sensor characteristic learning means calculates said learned correction value after a predetermined time has elapsed after turning on of an ignition key instead of stoppage of said engine or said feed pump.

11. The fuel pressure sensing apparatus for an internal combustion engine control unit according to claim 2, wherein said sensor characteristic learning means calculates said learned correction value after a predetermined time has elapsed after turning on of an ignition key instead of stoppage of said engine or said feed pump.

12. The fuel pressure sensing apparatus for an internal combustion engine control unit according to claim 3, wherein said sensor characteristic learning means calculates said learned correction value after a predetermined time has elapsed after turning on of an ignition key instead of stoppage of said engine or said feed pump.

13. The fuel pressure sensing apparatus for an internal combustion engine control unit according to claim 1, wherein in said sensor characteristic learning means, a predetermined time after stoppage of said engine or said feed pump is immediately before the start of engine cranking.

14. The fuel pressure sensing apparatus for an internal combustion engine control unit according to claim 2, wherein in said sensor characteristic learning means, a predetermined time after stoppage of said engine or said feed pump is immediately before the start of engine cranking.

15. The fuel pressure sensing apparatus for an internal combustion engine control unit according to claim 3, wherein in said sensor characteristic learning means, a predetermined time after stoppage of said engine or said feed pump is immediately before the start of engine cranking.

16. The fuel pressure sensing apparatus for an internal combustion engine control unit according to claim 1, wherein in said sensor characteristic learning means, a predetermined time after stoppage of said engine or said feed pump is immediately before said feed pump is actually driven to operate at an instant when a driving instruction is generated to said feed pump.

17. The fuel pressure sensing apparatus for an internal combustion engine control unit according to claim 2, wherein in said sensor characteristic learning means, a predetermined time after stoppage of said engine or said feed pump is immediately before said feed pump is actually driven to operate at an instant when a driving instruction is generated to said feed pump.

18. The fuel pressure sensing apparatus for an internal combustion engine control unit according to claim 3, wherein in said sensor characteristic learning means, a predetermined time after stoppage of said engine or said feed pump is immediately before said feed pump is actually driven to operate at an instant when a driving instruction is generated to said feed pump.

* * * * *